(12) United States Patent
Rozenbaoum et al.

(10) Patent No.: US 10,010,833 B2
(45) Date of Patent: Jul. 3, 2018

(54) SPIRAL WOUND MEMBRANE MODULE WITH REINFORCED FOLD LINE

(71) Applicant: LG NANOH2O, INC., El Segundo, CA (US)

(72) Inventors: Evgueni Rozenbaoum, Altadena, CA (US); Ales Devenica, San Carlos, CA (US)

(73) Assignee: LG NANOH2O, INC., El Segundo, CA (US)

( * ) Notice: Subject to any disclaimer, the term of this patent is extended or adjusted under 35 U.S.C. 154(b) by 157 days.

(21) Appl. No.: 14/624,983

(22) Filed: Feb. 18, 2015

(65) Prior Publication Data

US 2016/0236156 A1    Aug. 18, 2016

(51) Int. Cl.
| | | |
|---|---|---|
| *B01D 63/10* | (2006.01) | |
| *B01D 67/00* | (2006.01) | |
| *B01D 71/00* | (2006.01) | |
| B01D 71/68 | (2006.01) | |
| B01D 65/00 | (2006.01) | |

(52) U.S. Cl.
CPC .......... *B01D 63/103* (2013.01); *B01D 65/003* (2013.01); *B01D 67/0083* (2013.01); *B01D 71/68* (2013.01); *B01D 2323/286* (2013.01)

(58) Field of Classification Search
CPC .... B01D 63/10; B01D 63/103; B01D 63/106; B01D 63/12; B01D 63/14; B01D 65/003; B01D 69/02; B01D 69/06; B01D 2265/06; B01D 2313/04; B01D 2323/286; B01D 2325/08; B01D 2325/20; B01D 67/0083; B01D 67/0086; Y10T 156/1011; Y10T 156/1015; Y10T 156/1051; Y10T 428/24488; Y10T 428/24595
See application file for complete search history.

(56) References Cited

U.S. PATENT DOCUMENTS

| | | |
|---|---|---|
| 3,926,798 A | 12/1975 | Cadotte |
| 4,214,994 A | 7/1980 | Kitano et al. |
| 4,277,344 A | 7/1981 | Cadotte |
| 4,476,022 A | 10/1984 | Doll |
| 4,600,512 A | 7/1986 | Aid |
| 4,795,559 A | 1/1989 | Shinjou |
| 4,795,889 A | 1/1989 | Matuura et al. |
| 4,802,298 A | 2/1989 | Baugus |
| 4,842,736 A | 6/1989 | Bray et al. |
| 4,902,424 A | 2/1990 | Wrasidlo |
| 5,108,604 A | 4/1992 | Robbins |

(Continued)

*Primary Examiner* — Pranav N Patel
(74) *Attorney, Agent, or Firm* — Dentons US LLP (57) ABSTRACT

A spiral wound module in which the membrane sheet is heat and pressure treated to collapse at least some of the pores of the support layer. The treated membrane can then be folded along the heat and pressure treated area to form a crease. Once folded, the membrane sheet can be wound around a perforated inner tube along with a feed channel spacer and a permeate collection sheet. The wound module can then be enclosed into a hard shell with anti-telescoping devices at each end. By collapsing at least some of the pores in the support layer, the membrane becomes less permeable to fluid in the treated area. As such, there will be less or no leakage of unfiltered fluid passing through the fold line of the membrane sheet during operation of the wound module.

35 Claims, 4 Drawing Sheets

(56) References Cited

U.S. PATENT DOCUMENTS

| | | | |
|---|---|---|---|
| 5,108,607 A | | 4/1992 | Kraus et al. |
| 5,147,541 A | * | 9/1992 | McDermott, Jr. ..... B01D 63/10 156/290 |
| 5,435,957 A | | 7/1995 | Degen et al. |
| 5,543,046 A | | 8/1996 | Van Rijn |
| 5,919,026 A | | 7/1999 | Appleton |
| 6,156,680 A | | 12/2000 | Goettmann |
| 6,224,767 B1 | | 5/2001 | Fujiwara |
| 6,337,018 B1 | | 1/2002 | Mickols |
| 6,656,362 B1 | | 12/2003 | Kihara et al. |
| 6,881,336 B2 | | 4/2005 | Johnson |
| 7,048,855 B2 | | 5/2006 | de la Cruz |
| 7,109,140 B2 | | 9/2006 | Marand et al. |
| 8,177,978 B2 | | 5/2012 | Kurth et al. |
| 2003/0024868 A1 | | 2/2003 | Hallan |
| 2004/0195164 A1 | | 10/2004 | Hirokawa et al. |
| 2006/0049093 A1 | | 3/2006 | Chikura |
| 2007/0175812 A1 | | 8/2007 | Chikura et al. |
| 2008/0190836 A1 | | 8/2008 | Beppu et al. |
| 2008/0295951 A1 | | 12/2008 | Hiro et al. |
| 2010/0006504 A1 | | 1/2010 | Odaka et al. |
| 2010/0193428 A1 | | 8/2010 | Hane et al. |
| 2011/0084455 A1 | | 4/2011 | Elwell |
| 2011/0174728 A1 | | 7/2011 | Eisen et al. |
| 2013/0098829 A1 | | 4/2013 | Dontula et al. |
| 2013/0199988 A1 | | 8/2013 | Jons et al. |
| 2013/0240434 A1 | | 9/2013 | Yaeger |
| 2014/0014575 A1 | | 1/2014 | Kwon et al. |
| 2014/0353239 A1 | | 12/2014 | Lesan |

* cited by examiner

SPIRAL WOUND MEMBRANE MODULE WITH REINFORCED FOLD LINE

BACKGROUND OF THE INVENTION

Field of the Invention

The present invention relates to reverse osmosis and/or ultrafiltration spiral wound membrane cartridges for liquid separation.

Discussion of the Related Art

Ultrafiltration membranes, also known as permeable membranes, thin film composite (TFC) membrane, or reverse osmosis (RO) membranes, and their use in spiral wound modules or modules are ubiquitous. The use of ultrafiltration membranes in liquid separation through reverse osmosis has particularly become important in water desalination. Ultrafiltration membranes sheets typically include a felt backing layer and a support layer and a discrimination layer. The discrimination layer can be a polyamide film that can be used to filter the liquid. The support layer is located between the discrimination layer and the felt backing layer and generally is a porous polymer material such as polysulfone to allow the flow of filtered fluid. The felt backing layer is typically porus so as to allow fluid that has been filtered by the discrimination layer to flow through the membrane sheet and into the collection line around which the ultrafiltration sheets are wound. The collection lines typically comprise an inner tube that has holes to intake the fluid filtered by the ultrafiltration membranes. Exemplary embodiments of filtration modules are disclosed in, for example, U.S. Patent Application Publication No. 2013/0199988, which is incorporated herein by reference.

In forming the spiral module, leafs of ultrafiltration membranes are typically sandwiched in an assembly including a length of an ultrafiltration membrane sheet folded in half with the fold adjacent an inner tube, and with a length of a spacer or feed carrier material positioned between the sheet halves. This method involving the folding of the membrane sheet, however, typically causes cracks in the discrimination layer of the membrane sheets along or near the crease of the fold line. Cracks in the discrimination layer are not desirable because they result in lower rejection rates by allowing unfiltered fluid to reach the inner tube.

Different approaches have been attempted to resolve this issue with the fold line. One common approach is to use tape, such as polypropylene adhesive film, on the fold line either on one or both sides of the membrane sheet. However, use of tape has some drawbacks.

On the active side of the membrane the tape has been known to come off during use or cleaning. This is especially so when an antifouling layer of water soluble polyvinyl acetate (PVA) is formed on the discrimination layer. As the PVA dissolves during use, it affects the adhesion of the tape to the active layer side of the membrane. As the tape peels off, the cracks in the discrimination layer become expose and thus allow flow of unfiltered fluid through the membrane sheet.

When the tape is placed on the felt backing layer, the pressure of the water flowing through the felt layer can cause the tape to come loose and consequently to also allow for unfiltered fluid to flow into the inner tube.

Moreover, the use of tape can greatly increase the thickness of the membrane sheet at the fold line. This large thickness variation between the fold line and the rest of the membrane sheet creates additional stress on the discrimination layer during module assembly and operation. The additional stress can lead to more cracks that again would result in decreased effectiveness of the discrimination layer filtration.

Another approach to addressing this issue is described in U.S. Pat. No. 4,842,736, which is incorporated herein by reference. In that process the fold line is reinforced by application of a flexible sealant. Specifically, a sealant is impregnated into the membrane sheet so as to fill the voids of the felt backing layer and support layer and preferably penetrate completely up to the discrimination layer. This results in an impermeable area where the membrane sheet is folded. The sealant used can be either an adhesive or a tape that is applied via heat and pressure and which remains flexible after application, thereby still allowing the impregnated membrane sheet to be folded. In this manner, even if cracks form in the discrimination layer, no unfiltered fluid will flow through them.

In yet another approach to resolve this problem, U.S. Patent Application Publication No. 2013/0199988, which is incorporated herein by reference, provides two additional methods to avoid the problems of forming cracks in the discrimination layer of the ultrafiltration membrane. In this disclosure the membrane sheet is not folded. Instead, two membrane sheets are secured together to form a leaf. In one embodiment, the two membrane sheets are secured using a tape. In another embodiment the use of tape or adhesive is optional as one end of two membrane sheets are laminated together using heat and pressure.

Although the above and other methods have been employed with mixed success in avoiding defects at the fold line, they present very complex and expensive processes. They also include the use of adhesives and tapes that are required to be properly positioned and secured or impregnated into the membrane sheets. These processes encumber the manufacturing process of the spiral modules and require the expense for the additional time and materials.

In view of the above discussed disadvantages, there is a need for an improved method to reinforce the fold line that is more efficient but still effective.

SUMMARY OF THE INVENTION

Accordingly, the present invention is directed to a spiral wound membrane module with a reinforced fold line that substantially obviates one or more of the problems due to limitations and disadvantages of the related art.

Exemplary embodiments of the present invention provide a method of reinforcing and protecting the area around the fold line to reduce the possibility of crack formation at the fold.

Additional features and advantages of the invention will be set forth in the description which follows, and in part will be apparent from the description, or can be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a spiral wound module including at least one membrane sheet wound around the perforated inner tube, the membrane sheet comprising at least a discrimination layer and a support layer, the support layer comprising a polymer, the membrane sheet being folded such that a crease of a fold line is located in an area where the polymer density of the support layer is higher than the polymer density of the support layer elsewhere in the membrane sheet.

In another aspect of the present invention, provided is a method of making a spiral wound module including providing at least one membrane sheet having at least a discrimination layer and a support layer, the support layer having pores, applying pressure and heat to an area of the at least one membrane sheet for sufficient time to collapse at least some of the pores in the support layer in that area, and folding the at least one membrane sheet so as to form a crease only in the area to which pressure and heat was applied.

In another aspect of the present invention, provided is a method of making a folded membrane sheet including providing a membrane sheet having at least a discrimination layer and a support layer, the support layer having pores, applying pressure and heat to an area the membrane sheet for sufficient time to collapse at least some of the pores in the support layer in that area, and folding the membrane sheet so as to form a crease only in the area to which pressure and heat was applied. In an additional embodiment, a folded membrane sheet made by this method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Figure 1:
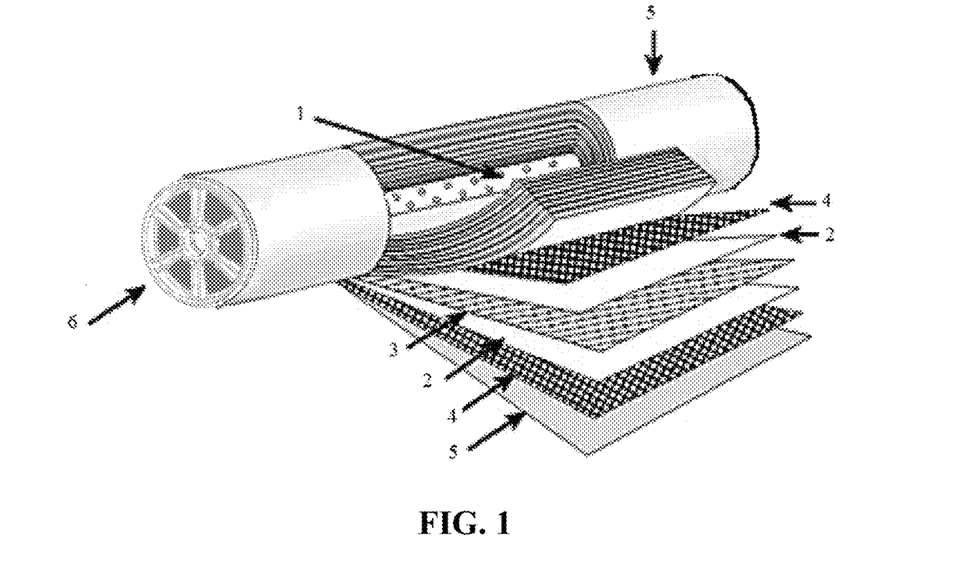
FIG. 1 is an exemplary embodiment of a wound module.

FIG. 1 illustrates an exemplary embodiment of a wound module. The module includes perforated inner tube 1 that collects the filtered fluid, and wound around inner tube 1 is a set of leafs composed of folded permeable membrane sheets 2, feed channel spacers 3, and permeate collection sheet 4. Around the outside of the module is a shell 5 and an anti-telescoping device 6 can be located at each end of the module.

The material and design of inner tube 1 are not particularly limited. Inner tube 1 may be made of any suitable material that is resistant to corrosion to the fluid being filtered. In exemplary embodiments, perforated inner tube 1 can be made of polyvinyl chloride (PVC). Other materials that can also be used include metals, polymers, ceramics, or combination thereof. Additional exemplary materials that can be used to form the perforated inner tube 1 include plastic materials such as acrylonitrile-butadiene-styrene, polysulfone, poly(phenylene oxide), polystyrene, polypropylene, polyethylene or the like. The size and location of the perforations can be arranged in any manner desirable as long as they allow for the filtered fluid to flow into the inner tube.

It is noted that for purposes of this specification, the terms "permeable" and "permeability" refer to the property of a material or membrane that causes it to allow liquids or gases meant to be filtered to pass through it. Thus, in exemplary embodiments wherein the fluid to be filtered is salt water or brackish water, permeability refers to the property of a material or membrane that cases it to allow water to pass through.

The construction of permeable membrane sheets 2 is not particularly limited. These membrane sheets should, however, allow for the filtering of a given fluid. In exemplary embodiments, the permeable membrane sheets can be designed to filter salt water. In alternative embodiments, the permeable membrane sheets can be designed to filter brackish water. A schematic, exemplary and non-limiting representation of the structure of a permeable membrane sheet is provided in FIG. 2. The permeable membrane sheet can include three main layers, a backside felt layer 210, a support layer 220 and a discrimination layer 230. In alternative embodiments, the permeable membrane sheet can include additional layers.

Figure 2:
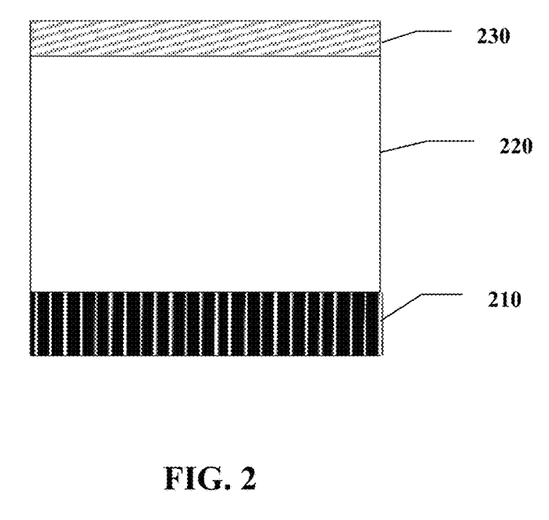
FIG. 2 is an exemplary and non-limiting representation of the structure of a membrane sheet.

The bottom or backside felt layer 210 can be a woven or non-woven fabric material. The backside felt layer can alternatively be a fibrous web mat including orientated fibers. In an exemplary embodiment, layer 210 is a layer of non-woven fibers orientated in the roll direction. The backside felt layer can provide structural strength and integrity to the membrane sheet. The backside felt layer or fabric layer is preferably permeable to water, flat, and without stray fibers that could penetrate support layer 220 or discrimination layer 230. The backside felt layer is preferably thin to decrease cost and to maximize membrane area, strong against extension, and mechanically resistant to deformation at high pressure. In exemplary embodiments, the backside felt layer 210 can be formed of polyester. Alternative polymeric materials can also be used. Exemplary materials that can be used as the backside felt layer 210 are disclosed in U.S. Pat. No. 4,214,994; U.S. Pat. No. 4,795,559; U.S. Pat. No. 5,435,957; U.S. Pat. No. 5,919,026; U.S. Pat. No. 6,156,680; U.S. Pat. No. 7,048,855; U.S. Patent Application Publication No. 2008/0295951; and U.S. Patent Application Publication No. 2010/0193428, all of which are incorporated herein by reference.

Over the backside felt layer the membrane sheet can include a porous support layer 220. The porous support layer can be formed of a polymer material. In an exemplary embodiment, porous support layer 220 can include a polysulfone layer. Other materials can also be used to form the support layer. Porous support layer 220 is typically 25 to 250 microns thick. The porous support layer can conventionally be made from any suitably porous membrane, such as polyethersulfone, poly(ether sulfone ketone), poly(ether ethyl ketone), poly(phthalazinone ether sulfone ketone), polyacrylonitrile, polypropylene, cellulose acetate, cellulose diacetate, or cellulose triacetate. These microporous materials can have smallest pores located very near the upper surface. Porosity at the surface can be low, for instance from 5-15% of the total surface area. Porous support layer 220 can be prepared by adding N-methylpyrrolidone (NMP) solvent (Across Organics, USA) to a polysulfone polymer (Mn-26,000 from Aldrich, USA) (Mn being the number average molecular weight) in transparent bead form in airtight glass bottles. Alternatively dimethylformamide (DMF) can be used as the solvent. The solution can be cast or spread over the backside felt layer 210 followed by one or more rinsing steps using demineralized water. Exemplary processes known in the art to form porous support layer 220 are disclosed for example, in U.S. Pat. No. 3,926,798; U.S. Pat. No. 8,177,978; U.S. Patent Application Publication No. 2011/0174728; and U.S. Patent Application Publication No. 2014/0014575, all of which are incorporated herein by reference.

The porosity of the polysulfone material can be measured by any method available in the art. In exemplary embodiments, the porosity may be measured based on density.

Determining porosity based on the polymer density of the support layer can be accomplished by dividing the polymer density of the support layer by a known monolithic density of the material constituting the support layer. Thus, in exemplary embodiments, the area, thickness and weight of a given sample of the membrane sheet can be measured. The support layer can then be removed from the given sample and the remaining structure can then be measured again to obtain the new thickness and weight. The weight of the support layer can then be calculated by subtracting the weight of sample without the support layer from the weight of the sample with the support layer. The difference in thickness can similarly be calculated. In doing so, it is possible to obtain the weight and thickness value of the support layer for a given sample. Other ways to obtain these values are also known and can be employed as well. Once the weight and thickness of the support layer are obtained for a given sample, whose surface area is also calculated, the polymer density of the support layer may be also calculated by dividing the weight of the support layer by the product of the area of the sample by the thickness of the support layer. The polymer density of the support layer can then be divided by the known monolithic density of the material constituting the support layer. For the purposes of this application, "monolithic density" is used to refer to the density of a material obtained from a non-porous sample. In exemplary embodiments, the support material is polysulfone. Thus, the monolithic density of polysulfone would be the density of a non-porous polysulfone layer which is known in the art or could easily be calculated by dividing weight by volume of a non-porous sample. The ratio of the polymer density of the support layer sample to the monolithic density of its constituent material times 100 provides the percentage porosity estimate of the support material. In exemplary embodiments, the above process was used to estimate the porosity of a polysulfone support layer in sample membrane that was not been heat pressed and that included a backside felt layer of polyester fabric about 95 µm thick, an a polysulfone layer about 35 µm thick and a polyimide discrimination layer. The known monolithic density of polysulfone material used in the exemplary embodiment was 1.23 g/cm³. The average porosity of the polysulfone support layer was estimated to be about 67-72%.

It is also possible to assess a support layer's permeability using a permeability test or a bubble point pressure test.

In a permeability test, water is passed through the membrane for a given period of time at a predetermined pressure. The permeability is then determined based on the amount of water that has passed through the sample. In an exemplary embodiment, water is flowed through a sample having a 1.75 inch diameter, at 15 psi, for one minute. Under these conditions, the volume of water that passes through the sample that has not been heat pressed is typically about 30 to 50 ml when testing a non-heat pressed membrane sheet that includes a backside felt layer of polyester fabric about 95 µm thick, an a polysulfone layer about 35 µm thick and a polyimide discrimination layer.

A bubble point pressure test may be performed using a bubble point analyzer. Bubble point analyzers are known in the art. In an exemplary embodiment, the bubble point analyzer used may be the BPT-101-A bubble point analyzer manufactured by Porous Materials, Inc. that has a pore size range of 0.03 to 500 µm, uses sample sizes of 1.75 to 2.5 inch diameter, can have customizable sample chambers, has a maximum operating pressure range of 0 to 200 psi, uses clean, dry, compressed air or nonflammable, non-corrosive gas, includes a pressure transducer range of 0 to 200 psi absolute, has a resolution of 1 in 10,000, an accuracy of 0.15% of reading, a mass flow transducer range of 0 to 10 cc/min, and a power requirement 110/220 VAC, 50/60 Hz. However, other bubble point analyzers may also be used, thus the PBT-101-A bubble point analyzer should not be viewed as limiting. The bubble point analyzer can provide a measurement of a material's largest through-pore (bubble point). A typical measurement for a membrane that has not been heat pressed and that includes a backside felt layer of polyester fabric about 95 µm thick, a polysulfone layer about 35 µm thick and a polyimide discrimination layer, tested at 15 psi, provides a value of about 35 to 40 nm.

Over porous support layer 220, a discrimination layer 230 can be formed. The discrimination layer can be any material that is able to filter the fluid for which the module is to be used. In an exemplary embodiment, the discrimination layer can be a polyamide layer. Also, in exemplary embodiments, the discrimination layer is designed to filter sea water or brackish water. In such embodiments, the discrimination layer is designed to filter salt from the sea water or brackish water. For purposes of this disclosure, the term "rejection rate" is used to refer to the percent reduction in concentration of the unwanted component from the fluid. Thus, for example, in the desalination process of salt water or brackish water, a rejection rate would be the percent reduction in salt concentration present in the permeate as compared to feed salt water or brackish water.

Although the chemistry of the discrimination layer is not to be viewed as limited, in an exemplary embodiment the polyamide layer can be formed by interfacial polymerization of a polar solution and a non-polar solution. Exemplary polar solution can be an aqueous solution of a polyamine such as m-phenylenediamine (MPD). Exemplary non-polar solution can be an organic solution of a polyfunctional acid halide such as trimesoyl chloride (TMC). Various additives to either or both solutions can also be present. Methods and chemistries that can be used to form the discrimination layer are generally known in the art. Exemplary embodiments of the discrimination layers, their chemistry and method of manufacturing them are disclosed in U.S. Pat. No. 8,177,978; U.S. Pat. No. 4,277,344; U.S. Pat. No. 4,902,424; U.S. Pat. No. 5,108,607; U.S. Pat. No. 5,543,046; U.S. Pat. No. 6,337,018; and U.S. Pat. No. 7,109,140, all of which are herein incorporated by reference.

Figure 3:
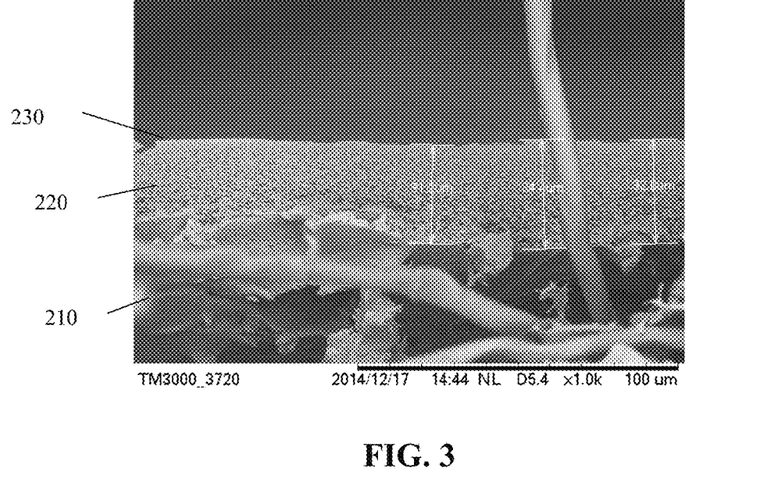
FIG. 3 is a SEM image of an exemplary embodiment of a cross sectional section of a support layer of a membrane sheet before pressure heat treatment.

FIG. 3 is a scanning electron microscope (SEM) image of an exemplary embodiment of a cross section of a membrane sheet that has not been heat pressure treated. Illustrated in FIG. 3 is a polyester backside felt layer, a polysulfone support layer and a portion of a polyamide discrimination layer. As discussed earlier, the polysulfone support layer and the backside felt layer are porous so as to allow the permeate from the discrimination layer to pass through the membrane sheet. It is noted that the discrimination layer 230 is much thinner than support layer 220 and backside felt layer 210, accordingly, item 230 in FIG. 3, and likewise in FIG. 4, points to the surface of the discrimination layer as opposed to the cross section of the layer as items 230 and 210 respectively do for the support and backside felt layers. It is further noted that in FIG. 3, the typical thickness of the support layer, when made of polysulfone, can be about 33 µm. Also, it is shown that the thickness is not exactly the same across the membrane sheet, the support layer, as well as the other layers of the membrane sheet, may have minor thickness variations. In the illustrative embodiment shown in FIG. 3, for example, the polysulfone layer has a thickness varying from 31.2 µm to 34.4 µm before it is heat pressed as discussed below.

Membrane sheets 2 are folded to form leafs such that the discrimination layer remains on the inside and the backside felt on the outside. Within each leaf of membrane sheet is a feed channel spacer 3. The feed channel spacer allows for the more efficient flow of the fluid to be filtered across the inner surface of the membrane sheet leaf. The pressurized fluid is forced through the discrimination membrane and thus filtered. As a result, the pressurized fluid leads to a permeate and a concentrate. For purposes of this disclosure, the term "permeate" when used as a noun refers to the fluid that has passed through an undamaged portion of the discrimination layer and thus has been filtered. Likewise, the term "concentrate" is used to refer to the fluid that has passed through the wound module but not through the discrimination layer. In exemplary embodiments, the concentrate will have a higher concentration of the material that is being filtered out of the fluid than was in the fluid before it passed through the wound module. In the case of salt water or brackish water, the concentrate will typically have a higher salt concentration than the initial salt water or brackish water.

The feed channel spacer is not limiting to the present invention. Any feed channel spacer can be used. Any material can be used to form the raw water-side channel component of the feed-side channel. In exemplary embodiments, the material is selected in view of corrosion resistance, heat resistance, and/or mechanical strength. Examples of such a material include polypropylene and polyethylene. In an exemplary embodiment, the feed channel spacer can have a configuration for optimum flow and lowest intrinsic resistance while maintaining some turbulent flow. In exemplary embodiments, the feed channel spacer can have a high degree of dimensional stability or stiffness to maintain separation between the membranes. In alternative embodiments a softer feed channel spacer, for instance one made from resins other than polypropylene, can be used to be gentler on the membrane. Many existing feed channel spacers are well known in the art. Exemplary embodiments of feed channel spacers are disclosed in U.S. Pat. No. 4,476,022; U.S. Pat. No. 6,656,362; U.S. Pat. No. 6,881,336; U.S. Patent Application Publication No. 2007/0175812; and U.S. Patent Application Publication No. 2008/0190836, all of which are incorporated herein by reference.

A permeate collection sheet 4 is added to better guide the permeate to perforated inner tube 1. The permeate collection sheet 4 can be formed of tricot polyester materials commonly known in the art. The material and design of permeate collection sheet 4 are not limited. In exemplary embodiments, the permeate collection sheet can be a tricot fabric woven from epoxy or melamine-coated polyester filaments. The tricot fabric can be porous and can form a series of parallel ridges, which keep the membrane leaf from collapsing, separated by grooves on one side of the fabric. The grooves can be oriented perpendicular to the perforated inner tube to provide less obstructed passages for permeate to flow inwards through the leafs to the inner tube. A separate reinforcing or anti-bagging layer, made, for example, of felt or another non-woven or otherwise porous sheet material, can be placed between the membrane sheet and the tricot fabric to help keep the membrane sheet from being pressed into the grooves of the tricot. Exemplary disclosures of permeate collection sheets are provided in U.S. Pat. No. 6,656,362; U.S. Pat. No. 4,802,298; U.S. Pat. No. 7,048,855; U.S. Patent Application Publication No. 2013/0098829; Patent Application Publication No. 2010/0006504; and Patent Application Publication No. 2004/0195164, all of which are incorporated herein by reference.

An outer shell can be formed after the membrane sheet, feed channel spacer and permeate collection sheet have been wrapped around the perforated inner tube. The outer shell can be formed of fiber reinforced plastic (FRP), rigid thermoplastic, fiberglass, or metal tube, or can be made of a non-rigid material, such as, for example, but not limited to, tape. The outer shell can also be made of other composite wound materials or processes. Any suitable material known in the art to form the outer shell can be employed. In exemplary embodiments, the shell can be fabricated from any combination of composite materials including fiberglass, carbon fiber and other natural or manmade fibers and combined with polyester, epoxy and other resins. The outer shell can be formed by wrapping a flexible material such as fiberglass around the wound module. In an exemplary embodiment, the outer shell can be formed of wrapped fiberglass threads reinforced by polyurethane and dried to form a hard outer shell. Alternatively, the outer shell can be made from extruded stock material, of a cylindrical shape, made from polymers, metals or composite materials. Exemplary outer shell materials and designs are provided in U.S. Pat. No. 4,600,512; U.S. Pat. No. 5,108,604; and U.S. Patent Application Publication No. 2013/0240434, all of which are incorporated herein by reference.

Anti-telescoping devices can be placed at each end of the module. Anti-telescoping devices can be made of any suitable material, including polyvinylchloride. The anti-telescoping devices can be designed to prevent unwanted telescoping of the wound module. Also, anti-telescoping devices can be designed to interlock with or to be connected to anti-telescoping devices from other modules. The anti-telescoping devices will preferably be designed to allow the flow of unfiltered fluid into and out of the wound module. The anti-telescoping devices will also preferably be designed to allow the flow of permeate fluid collected by the inner tube to flow out of the wound module. Moreover, sealing members known in the art, such as sealing rings, can be implemented in conjunction with the anti-telescoping devices. Exemplary embodiments of the anti-telescoping devices and sealing members are disclosed in U.S. Pat. No. 6,224,767; U.S. Application Publication No. 2003/0024868; U.S. Application Publication No. 2006/0049093; U.S. Application Publication No. 2011/0084455; and U.S. Application Publication No. 2014/0353239, all of which are incorporated by reference herein.

As described earlier, when folding the membrane sheet to form leafs to be wound around the perforated inner tube, cracks can form in the discrimination layer. Such cracks can lead to leaks through which the pressured feed fluid can pass and reach the inner tube without being filtered. This type of leaks would decrease the overall efficiency of the filtration by reducing the rejection rate.

In exemplary embodiments, the leakage of unfiltered fluid at or near the fold line of the membrane sheet can be avoided by rendering a given area of the membrane sheet impermeable without necessitating the use of tape or adhesive as employed in the prior art.

In exemplary embodiments, the area of the membrane sheet over which the fold line is to be formed is heat pressed to render the support layer 220 less permeable. The impermeability of support layer 220 is achieved by densifying the polymer of the support layer through the elimination or collapse of pores found therein.

For purposes of this specification, reference to the "density of the support layer," "polymer density of the support layer," or "densification of the polymer of the support layer" refer to the compactness of the polymer that makes up the support layer. Thus, the increase in density of the support layer, increase of the polymer density of the support layer, or densification of the polymer of the support layer results from increasing the degree of compactness of the polymer making up the support layer at a given location by collapsing the pores found in the polymer making up the support layer and not by impregnating additional material into the support layer. For instance, in exemplary embodiments in which the support layer is formed of polysulfone, the increase in density of the support layer, increase of the polymer density of the support layer, or densification of the polymer of the support layer refers to the densification of the polysulfone material that makes up the support layer by collapsing pores in the polysulfone polymer. This densification can also lead to a strengthening of the support layer and thus can also be referred to as reinforcement of the support layer. Also, as used in this specification, the term "collapse" or "collapsing" as used with respect to the pores of the polymer of the support layer is intended to be understood broadly to include elimination of the pores as well as reduction in pore sizes.

The densification of the polymer of the support layer in accordance with the present invention does not include filling the pores with additional material as would be the case, for example, if the membrane sheet were to be impregnated with an adhesive. In such embodiments where the polymer is impregnated by additional material the polymer density of the support layer in the impregnated area would remain the same even though the overall density of the impregnated layer in that area can be increased.

It is important to note that although tape or adhesive material can be used in conjunction with the present invention, the additional tape or adhesive are not required here. The densification of the polymer of the support layer can be achieved solely through the application of heat and pressure alone.

To the extent tape or other adhesive material is added after the heat pressure treatment, it should be understood that some impregnation of the support layer can occur that can further improve the impermeability of the support layer and potentially further increase the density of the overall thickness of area occupied by the support layer. Such addition of material is not excluded from the scope of this invention. However, such addition of tape or adhesive material impregnated into the support layer would not be required for the implementation of the present invention and any impregnation would occur only after the treatment process of the membrane in accordance with the process described herein that would have already increased the polymer density of the support layer in the treated area. The decrease in porosity of the support layer renders that area of the membrane sheet effectively impermeable to the fluid and thus prevents the flow of any unfiltered fluid from any cracks formed in the discrimination layer at or near the fold line. In exemplary embodiments, the decrease in porosity in the support layer also reinforces the membrane in the treated area.

The portion of the membrane sheet that is treated to increase the polymer density of the support layer ("treated area") can be approximately 0.375 to 2 inches wide and it is located along the length of the crease of the fold line that is to be formed. In exemplary embodiments, the treated area can be 0.5 inch wide, 0.75 inch wide, 1 inch wide, 1.25 inch, 1.5 inch, or 1.75 inch wide. The fold line can be located in the center of the width of the treated area. In exemplary embodiments, the fold line is located over the treated area not necessarily in the center of the width of the treated area. The width of the treated area can be increased if necessary, depending on the application. However, treating too large of an area would interfere with the operation of the wound module as it would decrease the surface area of the membrane sheet that is able to filter the pressurized fluid.

The densification of the polymer of the support layer can be accomplished using various means. For example, commercial heat sealers, presses, rollers and other similar devices can be used to apply the appropriate amount of heat and pressure. In an exemplary embodiment, the heat and pressure is applied using a table top direct heat press. An exemplary equipment that can be used is the W-300DAT table top heat sealer with modified heat bars that is 12 inches in length and a 3 inch width plate to plate. The W-300DAT has a power supply 110 V, power of 350 W, operates at a temperature ranging between 0 and 300° C. The heat press may also be equipped with an electronic thermo controller for maintaining consistent temperature and an electronic timer to control the heating time. Once the settings of the thermostat and timer are set, consistent heat pressure can be maintained. Other types of heat presses may also be used.

The temperature of the heat applicator should be equal to or higher than the softening point of the porous support layer. The temperature, thus, is dependent on the glass transition temperature of the material used as the support layer. The temperature of the heat applicator is selected to be sufficient to collapse the support layer's pores thus making the support layer, and consequently the affected area of the membrane sheet, impermeable or effectively impermeable to the fluid meant to be filtered. In exemplary embodiments the temperature of heat applied is at least as high as the glass transition temperature of the material of the support layer. The temperature, however, should not be so high as to melt the backside felt support that would lead to a loss in the membrane sheet integrity. Thus, the maximum temperature is governed by the melting point of the material used for the backside felt layer.

The pressure applied to the membrane sheet can be in the range of 0.5 to 50 psi, and more preferably between 1 to 20 psi. Too high a pressure could damage the discrimination layer or result in more cracks at the border between the densified layer and the non-densified layer. Too low a pressure can result in insufficient densification of the polymer of the support layer.

The heat and pressure can be applied to either one or both sides of the membrane sheet. In an exemplary embodiment the heat and pressure are applied to both sides of the membrane sheet. In alternative embodiments, the heat and pressure are applied only to the discrimination layer. In yet another embodiment the heat and pressure are applied only to the backside felt layer. Still in alternative embodiments, the heat and pressure are applied on different sides. For example pressure is applied to one side of the membrane sheet while heat is applied to the other side of the membrane sheet. Heat and pressure are preferably applied at the same time. However, in an exemplary embodiment, the membrane sheet can first be heated and then pressed.

The heat and pressure should be applied for a time sufficient to collapse the support layer's pores. In some embodiments the heat and pressure are applied for at least 2 seconds. In exemplary embodiments, the heat and pressure are applied simultaneously for at least 3 seconds. Application of the heat and pressure for longer than 3 seconds can be performed as long as the application does not result in the deterioration of the integrity of the membrane sheet. In exemplary embodiments, the heat and pressure are applied at least on one side of the membrane sheet for 4, 5, or 6 seconds.

In exemplary embodiments, the support layer is polysulfone with a polyester backside felt. In such embodiments, the temperature of the heat applicator should be at least 180° C. This is about the glass transition temperature of polysulfone. This will allow the pores found in the polysulfone layer to collapse, rendering it and thus the membrane sheet at that location, impermeable. The temperature, however, should not exceed 240° C. as that would exceed the melting point of the of the polyester backside felt. The application of heat and pressure in this exemplary embodiment can be carried out over an area of 0.375 to 2 inches wide within which the crease of the fold line is to be formed. In some embodiments, the application of heat and pressure can be conducted for at least 3 seconds from both sides of the membrane sheet.

Figure 4:
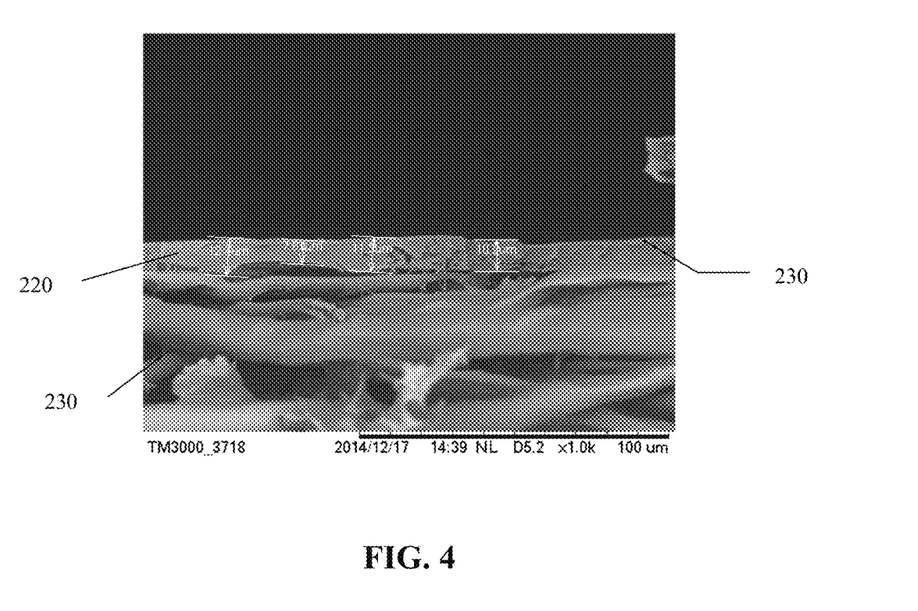
FIG. 4 shows SEM images of exemplary embodiments of a cross-section of a support layer of a membrane sheet that is reinforced and rendered impermeable according to the embodiments described herein by pressure heat treatment.

FIG. 4 shows SEM images of an exemplary cross-section of a membrane sheet in which the support layer has been reinforced and rendered impermeable according to the embodiments described herein. The exemplary membrane sheet includes a polyamide discrimination layer, a polysulfone support layer and a polyester backside felt layer. A notable difference between the SEM image of FIG. 3 and the SEM image of FIG. 4 is the decreased thickness and porosity and thus increase in polymer density of the support layer of the treated membrane compared to the non-treated membrane. Specifically, as indicated in FIG. 4, the thickness of the support layer after heat pressure decreased to a range between 7.8 µm and 12.4 µm. The decrease in thickness also results in decreased porosity and thus increased polymer density of the support layer and decreased permeability.

In exemplary embodiments, the porosity can be estimated from the thickness through a direct correlation. The porosity of a support layer may be eliminated either partially or completely by compressing the support layer by a fraction that is less than or equal to the starting porosity. The closer the percent decrease in thickness of the support layer matches the starting estimated or expected porosity, the closer the support layer and thus the membrane sheet become impermeable. For example, if the porosity of a 33 µm layer of polysulfone is estimated or expected to be about 70%, then such porosity can be expected to decrease to 0% when the thickness of the polysulfone material is reduced by 70%, i.e. to about 9 µm. As discussed herein, the invention does not require complete compression of the support layer.

In exemplary embodiments, the support layer is compressed to achieve a permeability that is at least less than the permeability of the discrimination layer. In alternative embodiments, for example as shown in FIG. 4, the support layer may be compressed at least as much as its estimated or expected porosity to achieve complete or almost complete impermeability.

In exemplary embodiments the porosity of the porous support layer 220 in the pressure heated area of the membrane sheet is completely eliminated. However, complete collapse of all the pores in the support layer is not necessarily required.

In exemplary embodiments, only sufficient pores are collapsed so as to decrease the permeability of the support layer to a desired level. In exemplary embodiments the pores are eliminated. The change in permeability may be estimated through a permeability test as discussed above.

In exemplary embodiments, the support layer may be pressed to induce reduced pores sizes instead of complete elimination of the pores. Elimination of some pores may also be induced in combination with reduced pores sizes. The reduced largest pore size can be detected through a bubble point test as discussed above. Reduced pores sizes can lead to decreased permeability of the support layer and thus also achieve a desired range of permeability or impermeability.

The porosity of the support layer located in the treated area is not necessarily required to be eliminated uniformly through the support layer. In exemplary embodiments, only pores at or near one of the upper or lower surfaces of the support layer are collapsed via the heat pressure treatment. In alternative embodiments, only pores at the core of the support layer are collapsed. In yet additional embodiments, pores from different cross sectional areas of the support layer are collapsed. In a preferred embodiment, pores across the thickness of the support layer in the treated area are collapsed.

In exemplary embodiments, the porosity of the support layer is reduced enough to effectively reduce the permeability of the membrane sheet in the treated area. In exemplary embodiments the permeability of the support layer is decreased to be lower than the permeability of the discrimination layer. In exemplary embodiments, the support layer in the treated area is not completely impermeable to the fluid meant to be filtered. In alternative embodiments, the support layer in the treated area is completely impermeable to the fluid meant to be filtered.

After the designated area of the membrane sheet has been treated by heat and pressure as discussed above, the membrane sheet can be folded over a feed spacer with the discrimination layer facing the feed spacer. In exemplary embodiments no tape or adhesive is used along the fold line. In alternative embodiments, tape and/or adhesive can be added to one or both sides of the already heat pressure treated membrane sheet to provide additional protection.

Moreover, an increase in impermeability in the treated area of the membrane sheet can further be obtained by the compression of the discrimination layer and/or of the backside felt layer. The impermeability of these layers can further improve the effectiveness of the present invention and thus can be within the scope of the present invention. However, in exemplary embodiments, the impermeability of the treated area of the membrane sheet is mostly if not completely provided by the densification of the polymer of the support layer.

The following comparative examples are provided to show the improved results the present invention provides when compared to previously known methods for reinforcing the membrane sheets along the fold line.

A first comparative example was run using individual coupons of standard reverse osmosis membrane. For purposes of this discussion a coupon refers to the samples used as described below. Three types of coupons were prepared as follows.

First type of coupon consisted of an unfolded membrane sheet with tape applied where the fold line would be located. The membrane sheet in the first coupons were not heat pressed to increase the polymer density of the support layer as described earlier. The first type of coupons were used as the control for comparison purposes because without folding the membrane does not incur any cracking and the tape is expected to not peal. It should be recognized that the first type of coupon only provides the best seal a taped membrane can provide when not folded. An unfolded membrane is not typically used in a wound module.

The second type of coupon consisted of a folded membrane sheet having tape applied along the fold line. The second type of coupon was also not heat pressed to increase the polymer density of the support layer as described earlier. Thus, the second type of coupon resembled the typical set up found in the prior art wound module.

The third type of coupons consisted of folded membrane sheets that were heat pressed to form an impermeable area along the fold line prior to folding as described earlier in accordance with embodiments of the present invention. No tape was applied to the heat treated membranes of this third type of coupon. The heat treatment was applied using different temperatures for type three coupons. Specifically, the heat pressure treatments were conducted at 170° C. for 5 seconds for one membrane sheet, at 185° C. for 5 seconds for another membrane sheet, and at 200° C. for 5 seconds for another membrane sheet.

The material composition of the membrane sheets used for all three types of coupons was the same. Each membrane sheet included a polyamide discrimination layer, a polysulfone support layer, and a polyester backside felt layer. The coupons were tested using standard sea water testing conditions (Knudsen salinity of 35.00 ppt) at a pressure of 800 psi, at room temperature.

Figure 5:
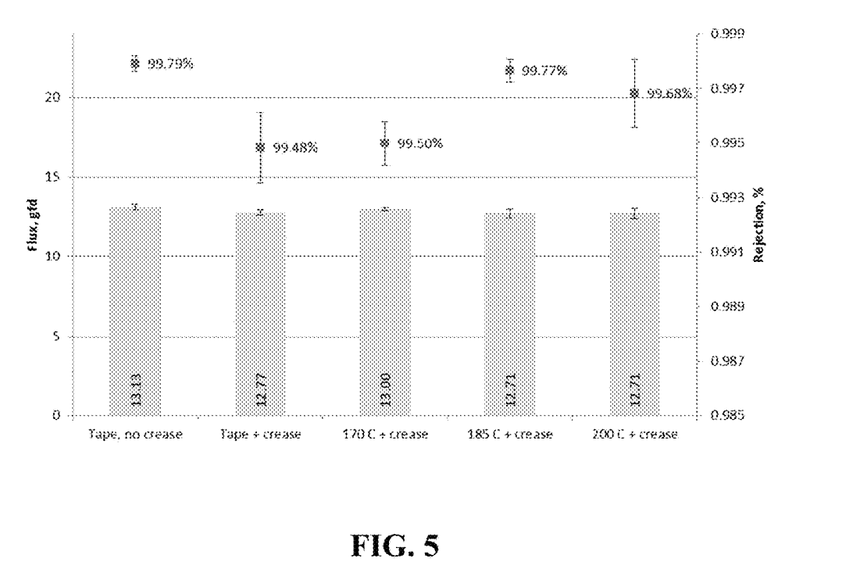
FIG. 5 is a graphical representation of the results obtained in comparative example 1.

FIG. 5 compares the flux and rejection rate of each type of coupon. As shown, the control coupon consisting of an unfolded membrane with tape, showed a rejection rate of 99.79% at a flux of 13.13 gallons/ft$^2$/day ("gfd"). These numbers greatly changed with coupon two, i.e. once a membrane sheet with tape was folded as typically used in the art. FIG. 5 shows that the second coupon exhibited a decreased rejection rate of 99.48% at an even lower flux rate of 12.77 gfd.

In comparison, implementation of the pressurized heat treatment as discussed in conjunction with embodiments of the present invention provided greatly improved results with respect to the folded coupons. The results for coupon three, which did not use tape and instead was only pressure heat treated, showed a rejection rate of 99.50% at 13 gfd for the membrane treated at 170° C., a rejection rate of 99.77% at 12.71 gfd for the membrane treated at 185° C., and a rejection rate of 99.68% at 12.71 gfd for the membrane treated at 200° C.

These results demonstrate that when comparing folded membrane sheets, i.e. coupons two and three, a pressure heated membrane performs substantially better than a non-treated membrane that instead has been equipped with tape as typically used in the art. For example, the membrane treated at 170° C. has a better rejection rate at a higher flux than the taped membrane of the second coupon. When comparing the membranes treated at 185° C. and 200° C. to the second coupon, it is noticeable that at very similar flux rates the rejection rates of the treated membranes are much greater than the rejection rate of the untreated taped folded membrane. In fact, it is noted that the rejection rate for the folded membrane sheet treated at 185° C. is very similar to the rejection rate of the first coupon in which the membrane sheet was not even folded.

Figure 6:
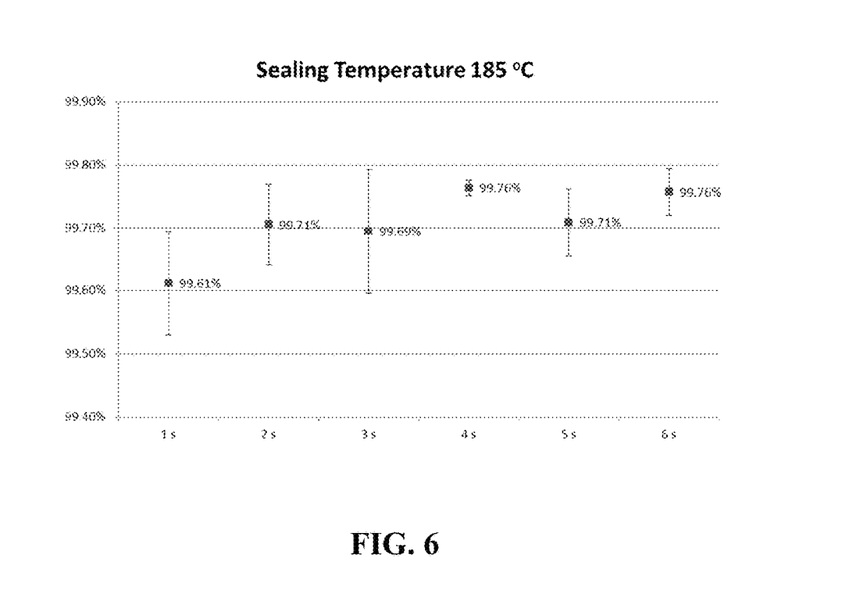
FIG. 6 illustrates comparative data to show the effect of the duration of the pressurized heat treatment on the performance of the membrane sheet.

FIG. 6 illustrates comparative data to show the effect of the duration of the pressurized heat treatment on the performance of the membrane. In this second comparative example, six membranes were pressure heat treated at the fold line prior to being folded. The pressurized heat treatment was performed at 185° C. for each membrane sheet. All membrane sheets used consisted of the same materials as in the previous example. The treatment was performed for 1 second, 2 seconds, 3 seconds, 4 seconds, 5 seconds, and 6 seconds respectively. Each test was run at the same flux of 1 gfd at 800 psi and at room temperature using standard sea water. As demonstrated in FIG. 6, it is preferable to pressure heat treat the membrane sheet for at least 2 seconds to achieve better densification of the membrane and thus achieve higher rejection rate. Also, as demonstrated in FIG. 6, the rejection rate increases as the pressurized heat treatment is extended. This is likely because the extended heat treatment results in greater collapse of the pores found in the support layer and thus higher polymer density of the support layer and lower permeability of the membrane sheet along the fold line.

Figure 7:
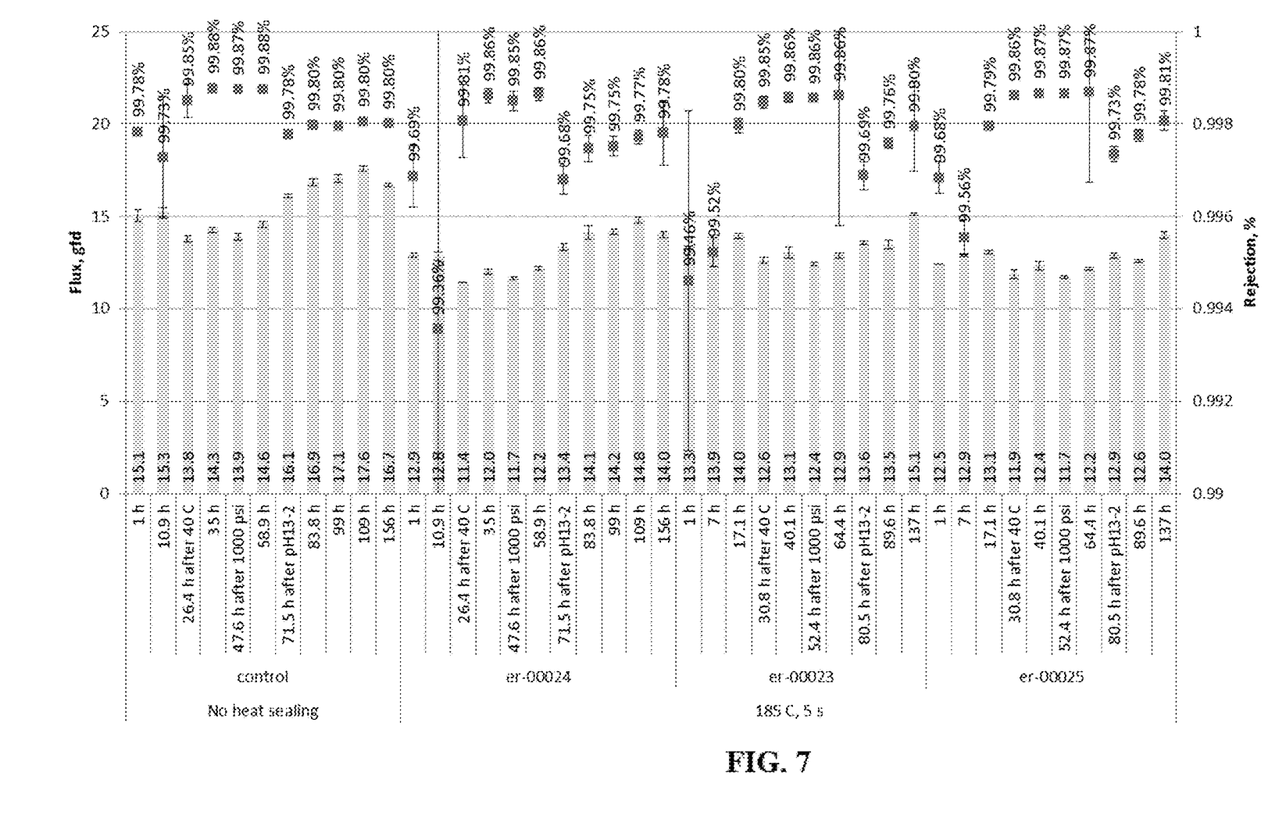
FIG. 7 provides comparative data for a stress test.

FIG. 7 provides comparative data for a stress test. In this comparative example 3, coupons were prepared by treating the membrane sheets at 185° C. for 5 seconds under 20 psi over a width of 0.375 inch along the length of where the crease was to be formed. Membrane sheets having the same structure as used in the first and second comparative examples, i.e. polyamide discrimination layer, polysulfone support layer, and polyester backside felt layer, were used. The membrane sheets were subjected to long term testing with variable testing conditions to simulate operation at elevated temperature, pressure, and cleaning conditions. Specifically, the testing was conducted as follows: 1) at standard 25° C. and 800 psi flow rate; 2) at elevated temperature of 40° C. and 800 psi; 3) at elevated temperature of 40° C. and elevated pressure flow of 1000 psi; and 4) at a pH of 13 and at pH of 2. The fluid used was standard salt water (Knudsen salinity of 35.00 ppt). As comparative examples, FIG. 7 also shows the test run for an untreated and unfolded membrane. The time provided on the x-axis of the graph in FIG. 7 should be understood to be cumulative. As demonstrated by the recorded data, the treated membrane sheets maintained high rejection rates comparable to those of the control membrane during the various conditions and for the full extent of the test.

Finally, the following Table I provides a comparison of flux and rejection rates between a standard membrane that has not been folded, pressure heat treated or equipped with tape or adhesive; a similar membrane that has been equipped with tape but no crease; a similar membrane with a crease but no tape; a similar membrane with crease and tape; and a similar membrane that was pressure heat treated and having a crease and tape. All membranes consisted of a polyamide discrimination layer, a polysulfone support layer, and a polyester backside felt layer. The test was again run using standard sea water, at 800 psi, and at room temperature.

TABLE I

| | GFD | % | B-Value |
|---|---|---|---|
| 121010C1 Standard Membrane | 15.57 | 99.79% | 1.59E−08 |
| 121010C1 Standard Membrane w/tape | 8.86 | 99.59% | 1.65E−08 |
| 121010C1 Standard Membrane w/crease | 62.35 | 12.55% | 0.0005542 |
| 121010C1 Standard Membrane w/crease and tape | 11.79 | 93.78% | 3.55E−07 |
| 121010C1 Standard Membrane w/crease and tape and heat | 11.12 | 99.70% | 1.57E−08 |

\* The % column in Table 1 refers to rejection rate.
\*\* B-Value is salt permeability coefficient multiplied by flux, units are m/s.

As shown the rejection rate of the pressure heat treated membrane with crease and tape is much higher compared to folded membranes with or without tape. This comparison also demonstrates the deterioration of the membrane when a crease is formed, showing a decrease in rejection rate from 99.79% to 12.55% and a drastic increase in flux from 15.57 gfd to 62.35 gfd. Similar observation can be seen in the instance when tape is applied. The unfolded membrane with tape exhibited a rejection rate of 99.59% while the folded membrane with tape exhibited a rejection rate of 93.78%. This data further demonstrates that the pressure heat treatment maintains a high rejection rate of 99.70%, which is very similar to 99.79% of an unfolded membrane with no crease or tape. Thus, the heat pressure treatment provided herein results in a creased membrane that has a relatively high rejection with a small difference in flux when compared to a control membrane with no crease.

It will be apparent to those skilled in the art that various modifications and variation can be made in the present invention without departing from the scope of the invention. Thus, it is intended that the present invention cover the modifications and variations of this invention provided they come within the scope of the appended claims and their equivalents.

What is claimed is:

1. A spiral wound module comprising:
   at least one membrane sheet wound around a perforated inner tube;
   the membrane sheet comprising at least a discrimination layer and a support layer;
   the support layer comprising a polysulfone polymer layer having a thickness;
   the membrane sheet comprising a pressure heat-treated area in which all of the pores across the thickness of the polysulfone polymer layer are eliminated by collapsing the pores, completely eliminating the porosity of the polysulfone polymer layer in the pressure heat-treated area and the polymer density of the polysulfone polymer layer is increased in the pressure heat-treated area compared to the polysulfone polymer density elsewhere in the membrane sheet without introducing additional material into the area the pressure heat-treated area, wherein the membrane sheet is folded such that a crease of a fold line is located in the pressure heat-treated area.

2. The spiral wound module of claim 1, further comprising:
   a feed channel spacer located inside the folded membrane sheet;
   a permeate collection sheet;
   wherein the feed channel spacer, the membrane sheet and the permeate collection sheet are all wound around the perforated inner tube.

3. The spiral wound module of claim 2, further comprising:
   an outer shell around the wound module; and
   an anti-telescoping device at each end of the wound module.

4. The spiral wound module of claim 1, wherein the porosity of the support layer within 0.375 inch of the crease is less than the porosity of the support layer elsewhere in the membrane sheet that is more than two inches away from the crease.

5. The spiral wound module of claim 1, wherein in the area where the polymer density of the support layer is higher, the support layer is less permeable than the discrimination layer.

6. The spiral wound module of claim 1, further comprising tape along the crease of the fold line of the membrane sheet.

7. The spiral wound module of claim 6, wherein tape is located on both sides of the membrane sheet.

8. The spiral wound module of claim 1, wherein the rejection rate of the wound module when used for sea water at room temperature is at least 99.70%.

9. The spiral wound module of claim 1, wherein the discrimination layer is a polyamide layer.

10. A method of making a spiral wound module comprising:
    providing at least one membrane sheet having at least a discrimination layer and a support layer;
    the support layer comprising a polysulfone polymer layer having pores and a thickness;
    applying pressure and heat to an area of the at least one membrane sheet for sufficient time to collapse the pores of the polysulfone polymer in the support layer in the area, wherein all of the pores across the thickness of the polysulfone polymer of the support layer in the area are collapsed completely eliminating the porosity of the polysulfone polymer layer in the area; and
    folding the at least one membrane sheet so as to form a crease only in the area to which pressure and heat were applied.

11. The method of claim 10, further comprising:
    placing a feed channel spacer within the fold of the at least one folded membrane sheet;
    winding a permeate collection sheet, the at least one folded membrane sheet and the feed channel spacer around an inner tube; and
    forming an outer shell.

12. The method of claim 10, further comprising applying the heat and pressure to both sides of the at least one membrane sheet.

13. The method of claim 12, further comprising applying the heat and pressure simultaneously to both sides of the at least one membrane sheet.

14. The method of claim 10, further comprising applying the heat and pressure to the at least one membrane sheet for at least 2 seconds.

15. The method of claim 10, further comprising applying the heat and pressure to the at least one membrane sheet at a temperature that is higher than the glass transition temperature of a support layer material.

16. The method of claim 10, wherein providing the at least one membrane sheet further comprises a felt backing layer, such that the support layer is located between the felt backing layer and the discrimination layer.

17. The method of claim 16, further comprising applying the heat and pressure to the at least one membrane sheet at a temperature that is less than the melting temperature of the felt backing layer.

18. The method of claim 10, further comprising applying the heat and pressure to the at least one membrane sheet over an area that is between 0.375 inch and 2 inches wide and along the length of where the crease is to be formed.

19. The method of claim 10, further comprising collapsing all the pores of the support layer found in the area where heat and pressure are applied.

20. The method of claim 10, further comprising rendering at least one area of the support layer impermeable by applying the heat and pressure to the at least one membrane sheet.

21. The method of claim 10, further comprising increasing a polymer density of the support layer in the area by applying the heat and pressure without introducing additional material into the support layer.

22. The method of claim 10, further comprising applying tape over the crease.

23. A method of making a folded membrane sheet comprising:
    providing a membrane sheet having at least a discrimination layer and a support layer, the support layer a polysulfone polymer layer having pores and a thickness;
    applying pressure and heat to an area of the membrane sheet for sufficient time to collapse all of the pores across the thickness of the polysulfone polymer layer of support layer in the area completely eliminating the porosity of the polysulfone polymer layer in the area; and
    folding the membrane sheet so as to form a crease only in the area to which pressure and heat were applied.

24. The method of claim 23, further comprising applying the heat and pressure to both sides of the membrane sheet.

25. The method of claim 24, further comprising applying the heat and pressure simultaneously to both sides of the membrane sheet.

26. The method of claim 23, further comprising applying the heat and pressure to the membrane sheet for at least 2 seconds.

27. The method of claim 23, further comprising applying the heat and pressure to the membrane sheet at a temperature that is higher than the glass transition temperature of a support layer material.

28. The method of claim 23, wherein providing the membrane sheet further comprises a felt backing layer, such that the support layer is located between the felt backing layer and the discrimination layer.

29. The method of claim 28, further comprising applying the heat and pressure to the membrane sheet at a temperature that is less than the melting temperature of the felt backing layer.

30. The method of claim 23, further comprising applying the heat and pressure to the membrane sheet over an area that is between 0.375 inch and 2 inches wide and along the length of where the crease is to be formed.

31. The method of claim 23, further comprising collapsing all the pores of the support layer found in the area where heat and pressure are applied.

32. The method of claim 23, further comprising rendering at least one area of the support layer impermeable by applying the heat and pressure to the membrane sheet.

33. The method of claim 23, further comprising increasing a polymer density of the support layer in the area by applying the heat and pressure without introducing additional material into the support layer.

34. The method of claim 23, further comprising applying tape over the crease.

35. A folded membrane sheet made by the process of claim 23.

* * * * *